United States Patent
Kim et al.

(10) Patent No.: US 7,362,914 B2
(45) Date of Patent: Apr. 22, 2008

(54) METHOD OF REDUCING A BLOCKING ARTIFACT WHEN CODING MOVING PICTURE

(75) Inventors: Hyun Mun Kim, Rockville, MD (US); Jong Beom Ra, Taejeon-si (KR); Sung Deuk Kim, Taejeon-si (KR); Young Su Lee, Seoul (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 11/835,209

(22) Filed: Aug. 7, 2007

(65) Prior Publication Data

US 2007/0269130 A1 Nov. 22, 2007

Related U.S. Application Data

(63) Continuation of application No. 11/619,893, filed on Jan. 4, 2007, now Pat. No. 7,305,142, and a continuation of application No. 09/506,728, filed on Feb. 18, 2000, now Pat. No. 7,239,755, and a continuation of application No. 09/010,446, filed on Jan. 22, 1998, now Pat. No. 6,028,967.

(51) Int. Cl.
G06T 5/00 (2006.01)
H03M 13/47 (2006.01)

(52) U.S. Cl. .................. 382/268; 375/240.27
(58) Field of Classification Search ............... 382/268, 382/269, 275, 205, 250, 251; 375/240.24, 375/240.27, 240.29, 240.01, 240.26; 348/420.1, 348/403.1, 607; 358/463, 3.26
See application file for complete search history.

(56) References Cited

U.S. PATENT DOCUMENTS 4,941,043 A 7/1990 Jass
5,337,088 A 8/1994 Honjo
5,422,964 A 6/1995 Devimeux
5,454,051 A 9/1995 Smith
5,590,064 A 12/1996 Astle (Continued)

FOREIGN PATENT DOCUMENTS

JP 2002-232889 8/2002

(Continued)

OTHER PUBLICATIONS

G. de Haan et al.; "IC For Motion-Compensation 100Hz TV with Natural-Motion Movie-Mode";*IEEE Transactions On Consumer Electronics*, vol. 42; pp. 165-174; Feb. 1996.

(Continued)

*Primary Examiner*—Scott A Rogers
(74) *Attorney, Agent, or Firm*—Fish & Richardson P.C.

(57) ABSTRACT

A method of coding a moving picture is provided that reduces blocking artifacts. The method can include defining a plurality of defining pixels $S_0$, $S_1$, and $S_2$, which are centered around a block boundary. If a default mode is selected then frequency information of the surroundings of the block boundary is obtained. A magnitude of a discontinuous component in a frequency domain belonging to the block boundary is adjusted based on a magnitude of a corresponding discontinuous component selected from a pixel contained entirely within a block adjacent the block boundary. The frequency domain adjustment is then applied to a spatial domain. Or, a DC offset mode can be selected to reduce blocking artifacts in smooth regions where there is little motion.

18 Claims, 3 Drawing Sheets

U.S. PATENT DOCUMENTS

| | | | |
|---|---|---|---|
| 5,629,778 | A | 5/1997 | Reuman |
| 5,677,736 | A | 10/1997 | Suzuki |
| 5,787,204 | A | 7/1998 | Fukuda |
| 5,796,875 | A | 8/1998 | Read |
| 5,852,682 | A | 12/1998 | Kim |
| 5,903,679 | A | 5/1999 | Park |
| 5,937,101 | A | 8/1999 | Jeon |
| 6,028,967 | A | 2/2000 | Kim |
| 6,151,420 | A | 11/2000 | Wober |
| 6,240,135 | B1 | 5/2001 | Kim |
| 6,317,522 | B1 | 11/2001 | Rackett |
| 6,320,905 | B1 | 11/2001 | Konstantinides |
| 6,724,944 | B1 | 4/2004 | Kalevo |
| 7,003,170 | B1 | 2/2006 | Martucci |
| 7,003,174 | B2 * | 2/2006 | Kryukov et al. ............ 382/275 |
| 7,031,393 | B2 | 4/2006 | Kondo |
| 7,054,503 | B2 | 5/2006 | Ishikawa |
| 7,209,594 | B1 | 4/2007 | Martucci |
| 7,233,706 | B1 | 6/2007 | Kim |
| 7,289,682 | B2 * | 10/2007 | Kim et al. ................. 382/268 |
| 7,305,142 | B2 * | 12/2007 | Kim et al. ................. 382/268 |
| 2005/0243911 | A1 | 11/2005 | Kwon |
| 2005/0243912 | A1 | 11/2005 | Kwon |
| 2005/0243913 | A1 | 11/2005 | Kwon |
| 2005/0243914 | A1 | 11/2005 | Kwon |
| 2005/0243915 | A1 | 11/2005 | Kwon |
| 2005/0243916 | A1 | 11/2005 | Kwon |
| 2005/0244063 | A1 | 11/2005 | Kwon |
| 2006/0274959 | A1 | 12/2006 | Piastowski |

OTHER PUBLICATIONS

Yung-Kai Lai et al.; "Image Enhancement for Low Bit-rate JPEG and MPEG Coding via Postprocessing"; *Proc. SPIE*, vol. 2727; pp. 1484-1494; Feb. 1996.

Shigenobu Minami et al.; "An Optimization Approach for Removing Blocking Effects in Transform Coding"; *IEEE Transactions on Circuits and Systems for Video Technology*, vol. 5, No. 2; pp. 74-82; Apr. 1995.

Yasuyuki Nakajima et al.; "A PEL Adaptive Reduction of Coding Artifacts for MPEG Video Signals"; *IEEE*; pp. 928-932; 1994.

Taner Özcelik et al.; "Image and Video Compression Algorithms Based on Recovery Techniques Using Mean Field Annealing"; Proceedings of the IEEE, vol. 83, No. 2; pp. 304-316; Feb. 1995.

Gary J. Sullivan et al.; "Motion Compensation for Video Compression Using Control Grid Interpolation"; *IEEE International Conference*; pp. 2713-2716; 1991.

Yongyi Yang et al.; "Regularized Reconstructions to Reduce Blocking Artifacts of Block Discrete Cosine Transform Compressed Images"; *IEEE Transactions on Circuits and Systems for Video Technology*; vol. 3, No. 6; pp. 421-432; Dec. 1993.

Avideh Zahor; "Iterative Procedures for Reduction of Blocking Effects in Transform Image Coding"; *IEEE Transaction on Circuits and Systems for Video Technology*, vol. 2, No. 1; pp. 91-95; Mar. 1992.

* cited by examiner block boundary

METHOD OF REDUCING A BLOCKING ARTIFACT WHEN CODING MOVING PICTURE

CROSS-REFERENCE TO RELATED APPLICATIONS

This application is a continuation of U.S. application Ser. No. 11/619,893, filed on Jan. 4, 2007, which is a continuation of U.S. application Ser. No. 09/506,728, filed on Feb. 18, 2000, now U.S. Pat. No. 7,239,755, which is a continuation of U.S. application Ser. No. 09/010,446, filed on Jan. 22, 1998, now U.S. Pat. No. 6,028,967, which claims the benefit of a foreign priority application filed in KOREA on Jul. 30,1997, as Ser. No. 36231/1997. This application claims priority to all of these applications, and all of these applications are incorporated by reference.

TECHNICAL FIELD

The present invention relates to a moving picture process, and in particular to a method for processing blocks of a moving picture to increase a compression ratio and to improve coding efficiency.

BACKGROUND

To efficiently compress a time variable video sequence, redundancy in the temporal domain as well as in the two dimensional spatial domain must be reduced. MPEG uses a discrete cosine transform (DCT) to reduce the redundancy in the two dimensional spatial domain and a motion compensation method to reduce the redundancy in the temporal domain.

The DCT is a method of reducing the correlativity between data through a two dimensional spatial transformation. Each block in a picture is spatially transformed using the DCT after the picture is divided into blocks. Data that has been spatially transformed tends to be driven to a certain direction. Only a group of the data driven in the certain direction is quantized and transmitted.

Pictures, which are consecutive in the temporal domain, form motions of a human being or an object at the center of the frame. This property is used to reduce the redundancy of the temporal domain in the motion compensation method. A volume of data to be transmitted can be minimized by taking out a similar region from the preceding picture to fill a corresponding region, which has not been changed (or has very little change), in the present picture. The operation of finding the most similar blocks between pictures is called a motion estimation. The displacement representing a degree of motion is called a motion vector. MPEG uses a motion compensation-DCT method so that the two methods combine.

When a compression technique is combined with a DCT algorithm, the DCT transform is usually performed after input data is sampled in a unit size of 8×8, and the transform coefficients are quantized with respect to a visual property using quantization values from a quantization table. Then, the data is compressed through a run length coding (RLC). The data processed with the DCT is converted from a spatial domain to a frequency domain and compressed through the quantization with respect to the visual property of human beings, not to be visually recognized. For example, since eyes of human beings are insensitive to a high frequency, a high frequency coefficient is quantized in a large step size. Thus, a quantization table is made according to external parameters, such as a display characteristic, watching distance, and noise, to perform an appropriate quantization.

For the quantized data, the data having a relatively high frequency is coded with a short code word. The quantized data having a low frequency is coded with a long code word. Thus, the data is finally compressed.

In processing a moving picture as discussed above, blocks are individually processed to maximize the compression ratio and coding efficiency. However, the individual process causes blocking artifacts that disturb the eyes of human beings at boundaries between blocks.

Accordingly, various methods for reducing a blocking artifact in a coding system, which individually processes blocks, are presented. For example, attempts to reduce the blocking artifact by changing processes of coding and decoding have been implemented. However, this method of changing the processes of coding and decoding increases the amount of bits to be transmitted.

Another method for reducing the blocking artifact is based on the theory of projection onto convex sets (POCS). However, this method is applied to only a still picture because of an iteration structure and convergence time.

The blocking artifact is a serious problem in a low transmit rate moving picture compression. Since a real-time operation is necessary in coding and decoding a moving picture, it is difficult to reduce the blocking artifact with a small operation capacity.

Consequently, the related art methods involve various problems and disadvantages when reducing a blocking artifact created in coding a moving picture. A calculation for performing an algorithm is complicated, and the calculation amount and time become correspondingly large. Further, the blocking artifacts are not reduced in either complex regions or smooth regions in a picture. In addition, the amount of bits to be transmitted increases.

The above references are incorporated by reference herein where appropriate for appropriate teachings of additional or alternative details, features and/or technical background.

SUMMARY

An object of the present invention is to provide a method for reducing a blocking artifact appearing when coding a moving picture that substantially obviates one or more of the limitations and disadvantages of the related art.

Another object of the present invention is to provide an MPEG-4 video coding method that reduces a blocking artifact in a real-time moving picture using a frequency property around boundaries between blocks.

A further object of the present invention is to provide a method for reducing a blocking artifact that increases a compression ration and increases a coding efficiency.

To achieve these and other advantages in whole or in parts, and in accordance with the purpose of the present invention as embodied and broadly described, a blocking artifact reduction method includes defining pixels centered around a block boundary and setting a default mode. Frequency information of the surroundings of the block boundary is obtained for each pixel using a 4-point kernel. A magnitude of a discontinuous component that belongs to the block boundary is adjusted in a frequency domain to a minimum value of a magnitude of a discontinuous component that belongs to the surrounding of the block boundary. The adjusting operation is then applied to a spatial domain. In addition, a DC offset mode is established, and in the DC offset mode the blocking artifact is also reduced, for example, in a smooth region where there is little motion.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DESCRIPTION OF DRAWINGS

The invention will be described in detail with reference to the following drawings in which like reference numerals refer to like elements wherein.

DETAILED DESCRIPTION

Figure 1:
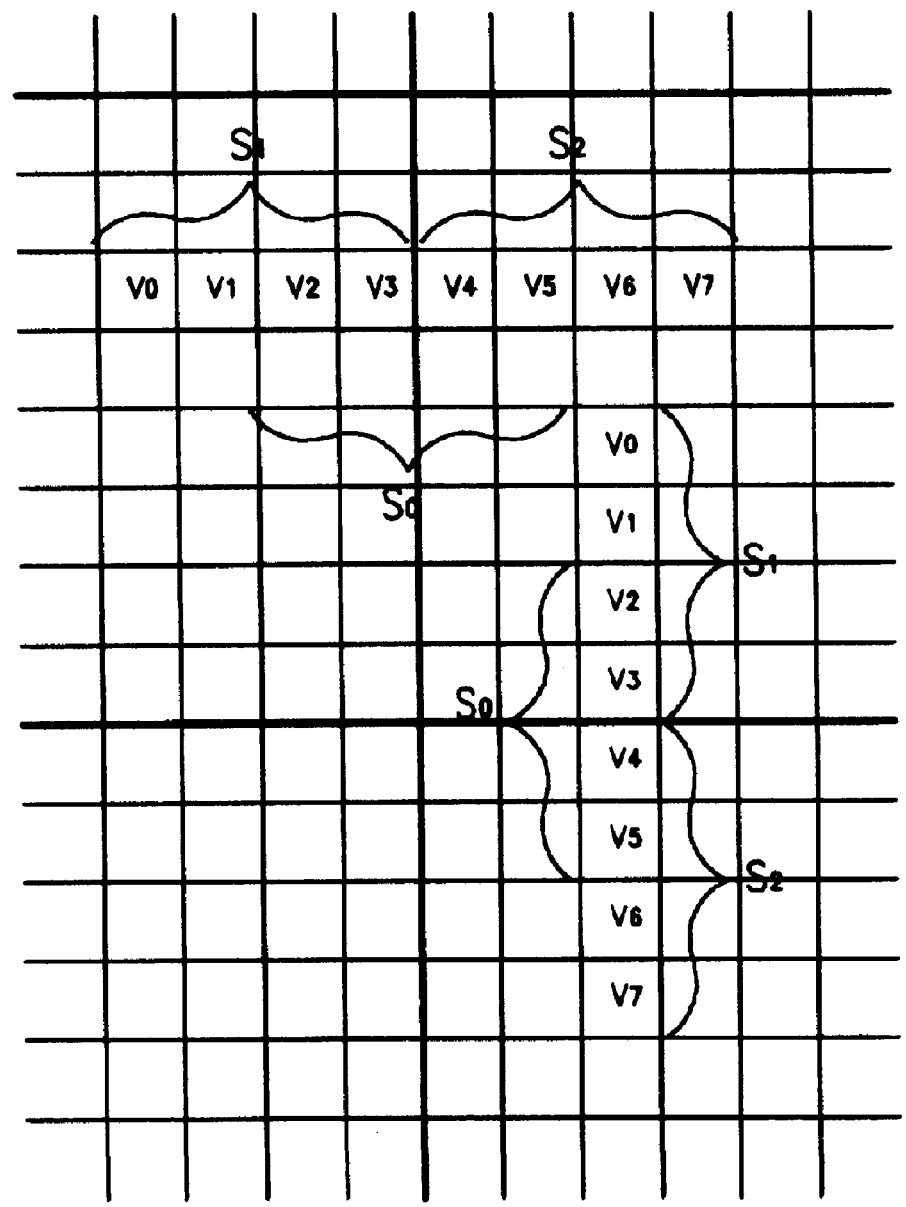
FIG. 1 is a diagram that illustrates horizontal and vertical block boundaries.

Reference will now be made to preferred embodiments of the present invention, examples of which are illustrated in the accompanying drawings. FIG. 1 illustrates typical horizontal and vertical block boundaries.

As shown in FIG. 1, in the dimensional image formed with respective four points of $S_0$, $S_1$, and $S_2$ located around the block boundary, $S_1$ and $S_2$ are individually processed with a block-unit compression method. Thus, $S_1$ and $S_2$ are not influenced by the blocking artifact. However, $S_0$ is located across a block boundary. Thus, $S_0$ is directly influenced by the blocking artifact. The blocking artifact appears at the boundary between fixed block patterns in the form of a line of discontinuity.

Preferred embodiments of the present invention use, for example, a frequency property to preserve complex regions at block boundaries. The frequency property around the boundary is preferably obtained by using a 4-point DCT kernel, which can be easily calculated. However, the present invention is not intended to be limited to this. In this case, the complex region at a block boundary can be effectively processed by extending the smoothness of a picture from a frequency domain to a spatial domain.

As shown in FIG. 1, $S_0$ is located across the block boundary. Thus, $S_0$ is directly influenced by the blocking artifact. To reduce the blocking artifact from $S_0$, a first preferred embodiment of the present invention uses frequency information in $S_1$ and $S_2$. The blocking artifact can be removed from $S_0$ by replacing the frequency component in $S_0$, which is influenced by the blocking artifact, with the frequency components of $S_1$ and $S_2$. In other words, $S_0$ contains a discontinuity. However, $S_1$ and $S_2$, which are completely included inside respective blocks, are not related to the discontinuity. Since $S_1$ and $S_2$ are not involved with the discontinuity at a block boundary, $S_1$ and $S_2$ can accurately represent features of the respective neighboring blocks.

When images change smoothly, image features of $S_0$, $S_1$ and $S_2$ are similar. This means that frequency domains of $S_0$, $S_1$ and $S_2$ have similar features. The preferred embodiments use a DCT, or the like as a frequency analysis tool. DCT is widely used in an image compression technique.

Figure 2:
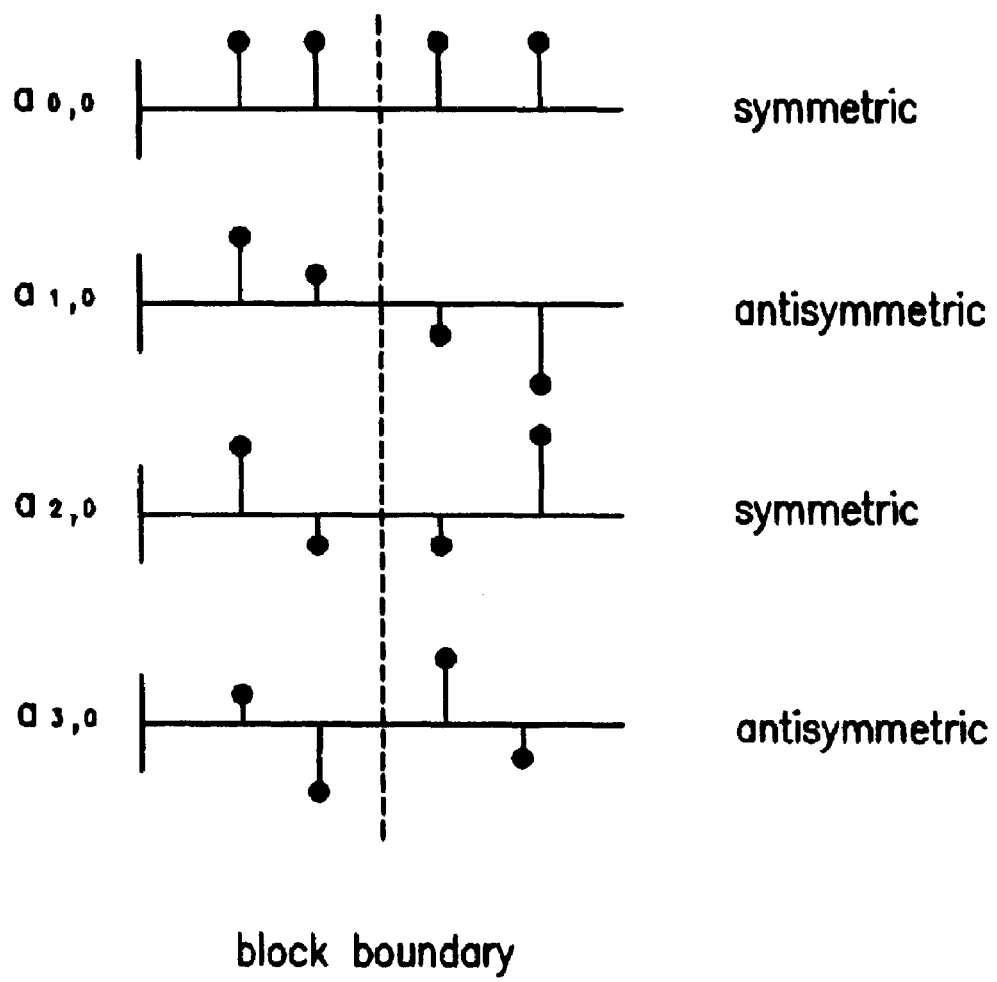
FIG. 2 is a diagram that illustrates a 4-point DCT kernel.

FIG. 2 is a diagram illustrating a 4-point DCT basis. As shown in FIG. 2, the 4-point DCT kernel basis has symmetric and anti-symmetric properties around the center of 4 points. In FIG. 2, $a_{0,0}$, $a_{1,0}$, $a_{2,0}$, and $a_{3,0}$ are defined as the 4-point DCT coefficients of $S_0$. Although both $a_{2,0}$ and $a_{3,0}$ are high frequency components, $a_{2,0}$ is symmetric, and $a_{3,0}$ is anti-symmetric around the center.

The center of $S_0$ is located at a block boundary as shown in FIG. 1. Thus, a factor directly affecting the block discontinuity is not the symmetric component but the anti-symmetric component. The magnitude of $a_{3,0}$ in a frequency domain is thus adjusted based on the anti-symmetric component being a major factor affecting the discontinuity. Accordingly, the proper adjustment of $a_{3,0}$ is directly related to the reduction of block discontinuity in the spatial domain. Reduction of the block discontinuity will now be described.

In a first preferred embodiment, the magnitude of $a_{3,0}$ is replaced with the minimum value of the magnitudes of $a_{3,1}$ and $a_{3,2}$, which are contained in a single block in an area surrounding a block boundary. By doing this, a large blocking artifact that appears when one side of the block boundary to be processed is smooth can be reduced. For a complex image where both $S_1$ and $S_2$ are the objects of motion (i.e., all the values of the magnitudes of $a_{3,0}$, $a_{3,1}$ and $a_{3,2}$ are large), there is little influence on the block boundary.

A method for reducing a blocking artifact in a default mode is as follows:

$$v_3' = v_3 - d;$$

$$v_4' = v_4 + d; \text{ and}$$

$$d = \text{CLIP}(c_2(a_{3,0}' - a_{3,0})//c_3, 0, (v_3 - v_4)/2) * \delta(|a_{3,0}| < QP).$$

In the method, $a_{3,0}' = \text{SIGN}(a_{3,0}) * \text{MIN}(|a_{3,0}|, |a_{3,1}|, |a_{3,2}|)$, and q is the component of DCT kernel. The condition $|a_{3,0}| < QP$ is used to count the influence of the quantization parameter on the blocking artifact. The $|a_{3,0}| < QP$ condition also prevents over-smoothing when the blocking artifact is not very serious. The clipping operation on the compensated value prevents the direction of the gradient at the boundary from being large or changed in an opposite direction. The boundary pixel values, $v_3$ and $v_4$, are replaced with $v_3'$ and $v_4'$. QP is the quantization parameter of the macroblock where $v_4$ belongs. Values, $c_1$, $c_2$, and $C_3$ are kernel constants used in the 4-point DCT. To simplify an equation according to a first preferred embodiment of the present invention, the values of $c_1$ and $c2$ are approximated to an integer, and the value of $c_3$ is approximated to a multiple of 2. The values of $a_1$, $a_2$, and $a_3$ are evaluated from the simple inner product of the DCT kernel and pixels, $S_0$, $S_1$, and $S_3$.

$$a_{3,0} = ([c_1 - c_2 c_2 - c_1] * [v_2 v_3 v_4 v_5]^T)/c_3$$

$$a_{3,0} = ([c_1 - c_2 c_2 - c_1] * [v_0 v_1 v_2 v_3]^T)/c_3$$

$$a_{3,0} = ([c_1 - c_2 c_2 - c_1] * [v_4 v_5 v_6 v_7]^T)/c_3$$

Such processes are performed in both horizontal and vertical block boundaries. In this manner, the blocking artifacts in the whole frame can be reduced.

The first embodiment reduces a blocking artifact in the default mode. However, in the default mode, only the boundary pixel values, $v_3$ and $a_4$, are compensated. Thus, the default mode is not sufficient to reduce the blocking artifact in a very smooth region, such as a setting in a picture.

To reduce the blocking artifact in the smooth region, a second preferred embodiment of a method for reducing blocking artifacts in a moving picture according to the present invention includes a DC offset mode. The method in the DC offset mode is as follows:

$$v_3' = v_3 - d;$$

$v_4' = v_4 + d;$ $v_2' = v_2 - d_2;$ $v_5' = v_5 + d_2;$ $v_1' = v_1 - d_3;$ and $v_6' = v_6 + d_3.$ In the second preferred embodiment, $d_1 = (3(v_3-v_4)/8) * \delta(|a_{3,0}|<QP),$ $d_2 = (3(v_3-v_4)/16) * \delta(|a_{3,0}|<QP),$ and $d_3 = (3(v_3-v_4)/32) * \delta(|a_{3,0}|<QP).$ The blocking artifact in the region where there is little motion, or which is a very small setting, is reduced through the above-described method or the like in the DC offset mode. An appropriate mode between the DC offset mode and default mode can be determined using the following conditional expression:

If
$(v_0==v_1 \&\& v_1==v_2 \&\& v_2==v_3 \&\& v_4==v_5 \&\& v_5==v_6 \&\& v_6==v_7)$

DC offset mode is applied; Else Default mode is applied.

When the DC offset mode or the default mode is selected according to the above conditional expression, the blocking artifacts are reduced in each mode. After determining the proper mode between the DC offset mode and the default mode, the block discontinuity at the boundary is compensated to form a consecutive line, which reduces the blocking artifact. In the second preferred embodiment, the DC offset mode and the default mode are set using $S_0$, $S_1$ and $S_2$. However, the present invention is not intended to be limited to this. Alternative sets of points or the like can be used.

An exemplary method for reducing a blocking artifact when coding a moving picture, according to the second preferred embodiment of the present invention, is described with reference to the flow chart shown in FIG. 3.

Figure 3:
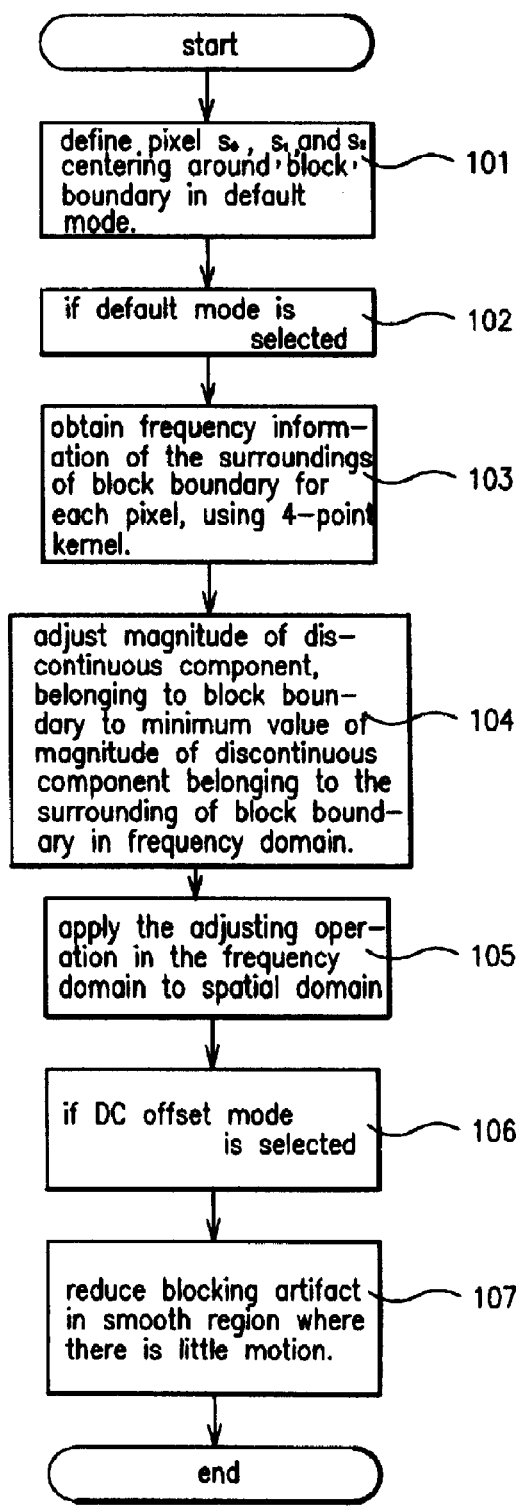
FIG. 3 is a flow chart that illustrates a preferred embodiment of a method that reduces a blocking artifact when coding a moving picture according to the present invention.

After beginning in FIG. 3, control continues to step 101. In step 101, a plurality of pixels, S0, S1, and S2 are defined centering around a block boundary. From step 101, control continues to step 102. In step 102, if a mode is selected, a default mode is set, and control continues to step 103.

In step 103, frequency information of the surroundings of the block boundary for each pixel is obtained using, for example, the 4-point DCT kernel. From step 103, control continues to step 104. In step 104, the magnitude of discontinuous component belonging to the block boundary is replaced with the minimum magnitude of the discontinuous components belonging to the surroundings of the block boundary in the frequency domain. From step 104, control continues to step 105, where the adjusting operation is applied to the spatial domain. The default mode is effective in reducing the blocking artifact in a complex region of a picture. However, the default mode is less successful in a smooth region such as a setting in a picture.

Therefore, in a smooth region it is necessary to reduce the blocking artifact in another mode, the DC offset mode. In step 106, the DC offset mode is established. From step 106, control continues to step 107. In step 107, the blocking artifact in the region where there is little motion, such as a setting, is reduced. From step 107, the process ends. Thus, the overall blocking artifacts can be reduced according to the preferred embodiments.

As described above, the blocking artifact reduction methods according to the preferred embodiments of the present invention have various advantages and effects. The blocking artifact is more easily and effectively reduced using features of the frequency domain. The preferred embodiments provide a visually finer quality of a picture by reducing the blocking artifacts in both the complex and smooth regions. Further, calculations are simple. Accordingly, the amount of bits does not increase.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of reducing a blocking artifact appearing when coding a picture, comprising:
   dividing the picture into blocks that each include multiple pixels, the picture including a first pixel of a first block separated from a second pixel of a neighboring second block by a block boundary;
   calculating an adjustment magnitude based on performing a clipping operation; and
   adjusting, if a value of the first pixel is not correlated to a value of a second pixel, the first pixel based on the adjustment magnitude.

2. The method of claim 1, wherein adjusting, if the value of the first pixel is not correlated to the value of the second pixel, the first pixel based on the adjustment magnitude further comprises adjusting, if the value of the first pixel is not equal to the value of the second pixel, the first pixel based on the adjustment magnitude.

3. The method of claim 1,
   wherein adjusting the first pixel further comprises replacing a pixel value $v_3$ of the first pixel with an adjusted pixel value $v_3'$,
   wherein the adjusted pixel value $v_3'$ is expressed as:

$v_3' = v_3 - d,$ wherein d is expressed as:

$$d = \text{CLIP}\left(c_2(a_{3,0}' - a_{3,0}) // c_3, 0, \frac{(v_3 - v_4)}{2}\right) * \delta(|a_{3,0}| < QP),$$

wherein $a_{3,0}'$ is expressed as:

$a_{3,0}' = \text{SIGN}(a_{3,0}) * \text{MIN}(|a_{3,0}|, |a_{3,1}|, |a_{3,2}|),$ and wherein QP represents a quantization parameter of the second block, $c_2$ and $c_3$ represent DCT kernel coefficients, and $v_4$ represents a pixel value of the second pixel.

4. The method of claim 3, wherein $\delta(|a_{3,0}|<QP)=1$ if $|a_{3,0}|<QP$, and wherein $\delta(|a_{3,0}|<QP)=0$ if $|a_{3,0}|\geq QP$.

5. The method of claim 3, wherein $c_2$ is an integer and $C_3$ is a multiple of 2.

6. The method of claim 4, wherein $c_2=5$ and $c_3=8$.

7. The method of claim 1, further comprising applying the adjusting operation to a spatial domain of the first pixel.

8. The method of claim 1, wherein the block boundary is a vertical or horizontal block boundary.

9. The method of claim 1, further comprising adjusting the second pixel based upon the adjustment magnitude.

10. The method of claim 1, wherein the adjustment magnitude is constrained to be no greater than half of the difference between a value of the first pixel and a value of the second pixel.

11. The method of claim 1, wherein the clipping operation is performed using frequency information of the second pixel.

12. The method of claim 1, wherein the clipping operation is performed using the first pixel and the second pixel.

13. The method of claim 12, wherein the clipping operation is performed using a minimum magnitude of frequency information of the first and second pixels.

14. The method of claim 12, wherein the clipping operation is performed using frequency information of the first pixel and the second pixel.

15. The method of claim 1, further comprising obtaining frequency information for the second pixel, wherein the first pixel is adjusted if a magnitude of the blocking artifact is less than a quantization parameter of the second block.

16. The method of claim 1, wherein the adjustment magnitude is further based upon a simple inner product of a DCT kernel and the first and second pixels.

17. An apparatus for reducing a blocking artifact appearing when coding a picture, the apparatus comprising a blocking filter configured to:

divide the picture into blocks that each include multiple pixels, the picture including a first pixel of a first block separated from a second pixel of a neighboring second block by a block boundary;

calculate an adjustment magnitude based on performing a clipping operation; and adjust, if a value of the first pixel is not correlated to a value of a second pixel, the first pixel based on the adjustment magnitude.

18. An apparatus for reducing a blocking artifact appearing when coding a picture, the apparatus comprising:

means for dividing the picture into blocks that each include multiple pixels, the picture including a first pixel of a first block separated from a second pixel of a neighboring second block by a block boundary;

means for calculating an adjustment magnitude based on performing a clipping operation; and means for adjusting, if a value of the first pixel is not correlated to a value of a second pixel, the first pixel based on the adjustment magnitude.

* * * * *